(12) United States Patent
Shuster et al.

(10) Patent No.: US 11,765,331 B2
(45) Date of Patent: *Sep. 19, 2023

(54) IMMERSIVE DISPLAY AND METHOD OF OPERATING IMMERSIVE DISPLAY FOR REAL-WORLD OBJECT ALERT

(71) Applicants: UTHERVERSE DIGITAL INC, New Westminster (CA); Gregory A. Piccionelli, New Westminster (CA)

(72) Inventors: Brian Shuster, Vancouver (CA); Gregory A. Piccionelli, Westlake Village, CA (US); Gary Stephen Shuster, Vancouver (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/864,304

(22) Filed: Jul. 13, 2022

(65) Prior Publication Data
US 2022/0345677 A1 Oct. 27, 2022

Related U.S. Application Data

(63) Continuation of application No. 16/544,754, filed on Aug. 19, 2019, now abandoned, which is a continuation of application No. 14/818,119, filed on Aug. 4, 2015, now Pat. No. 10,389,992.

(60) Provisional application No. 62/033,515, filed on Aug. 5, 2014.

(51) Int. Cl.
| | |
|---|---|
| *G06T 19/20* | (2011.01) |
| *G06T 19/00* | (2011.01) |
| *H04N 13/00* | (2018.01) |
| *H04N 13/30* | (2018.01) |
| *H04N 13/366* | (2018.01) |
| *H04N 13/254* | (2018.01) |
| *H04N 13/25* | (2018.01) |

(52) U.S. Cl.
CPC .......... *H04N 13/00* (2013.01); *G06T 19/006* (2013.01); *G06T 19/20* (2013.01); *H04N 13/30* (2018.05); *H04N 13/366* (2018.05); *H04N 13/25* (2018.05); *H04N 13/254* (2018.05)

(58) Field of Classification Search
None
See application file for complete search history.

(56) References Cited

U.S. PATENT DOCUMENTS

| | | | |
|---|---|---|---|
| 2008/0094351 A1 | 4/2008 | Nogami et al. | |
| 2013/0095924 A1* | 4/2013 | Geisner ................ | A63F 13/21 463/32 |
| 2013/0335301 A1 | 12/2013 | Wong et al. | |
| 2013/0342568 A1 | 12/2013 | Ambrus et al. | |
| 2015/0201181 A1 | 7/2015 | Moore et al. | |

(Continued)

*Primary Examiner* — Jeffrey J Chow
(74) *Attorney, Agent, or Firm* — Sherrie Flynn; Aisha Otori; COLEMAN & HOROWITT LLP

(57) ABSTRACT

An immersive display and a method of operating the immersive display to provide information relating to an object. The method includes receiving information from an input device of the immersive display or coupled to the immersive display, detecting an object based on the information received from the input device, and displaying a representation of the object on images displayed on a display of the immersive display such that attributes of the representation distinguish the representation from the images displayed on the display, wherein the representation is displayed at a location on the display that corresponds with a location of the object.

8 Claims, 2 Drawing Sheets

(56) References Cited

U.S. PATENT DOCUMENTS

| | | | |
|---|---|---|---|
| 2015/0234454 A1* | 8/2015 | Kurz | G06F 3/0425 |
| | | | 345/156 |
| 2015/0312447 A1 | 10/2015 | Omar | |
| 2015/0356837 A1 | 12/2015 | Pajestka et al. | |
| 2016/0025982 A1* | 1/2016 | Sutherland | G06F 3/04815 |
| | | | 359/13 |
| 2016/0027212 A1* | 1/2016 | Da Veiga | G02B 27/017 |
| | | | 345/633 |
| 2016/0364907 A1* | 12/2016 | Schoenberg | G02B 27/017 |

* cited by examiner

IMMERSIVE DISPLAY AND METHOD OF OPERATING IMMERSIVE DISPLAY FOR REAL-WORLD OBJECT ALERT

CROSS-REFERENCE TO RELATED APPLICATION

This application claims priority to and is a continuation of U.S. patent application Ser. No. 16/544,754, filed Aug. 19, 2019, which is a continuation of U.S. patent application Ser. No. 14/818,119, filed on Aug. 4, 2015, (now U.S. Pat. No. 10,389,992, issued Aug. 20, 2019), which claims priority under 35 U.S.C. § 119(e) to provisional application Ser. No. 62/033,515, filed Aug. 5, 2014, which applications are expressly incorporated by reference herein, in their entireties.

FIELD OF TECHNOLOGY

The present disclosure relates to immersive displays such as three-dimensional (3D) displays for displaying virtual or augmented reality environments.

BACKGROUND

Immersive displays are becoming increasingly popular for the purpose of playing games in a virtual reality environment. These immersive displays may also be utilized for applications other than gaming, including, for example, augmented reality applications. The virtual world or augmented-reality is currently commonly perceived by the user based on two images, with each of the two images displayed close to a respective one of the user's eyes.

Such displays are often head-mounted and in many cases block out some or all of the real environment around the user in order to immerse the user, for example, in the virtual world. Thus, these displays may obstruct or block the user's vision of his or her surroundings.

Improvements in immersive displays are desirable.

SUMMARY

According to one aspect, a method of operating the immersive display to provide information relating to an object is provided. The method includes receiving information from an input device of the immersive display or coupled to the immersive display, detecting an object based on the information received from the input device, and displaying a representation of the object on images displayed on a display of the immersive display such that attributes of the representation distinguish the representation from the images displayed on the display, wherein the representation is displayed at a location on the display that corresponds with a location of the object.

According to another aspect, an immersive display is provided. The immersive display includes a body, an input device coupled to the body for detecting objects in region outside the body, a display on the inside of the body for displaying a virtual image thereon, and a processor coupled to the input device and to the display and operable to receive information from the input device, detect an object in the region outside the body based on the information received from the input device, display a representation of the object on the virtual image displayed on the display such that attributes of the representation distinguish the representation of the object from the virtual image displayed on the display wherein the representation is displayed at a location on the display that corresponds with a location of the object.

BRIEF DESCRIPTION OF THE DRAWINGS

Embodiments of the present disclosure will now be described, by way of example only, with reference to the attached Figures, in which.

DETAILED DESCRIPTION

Figure 1:
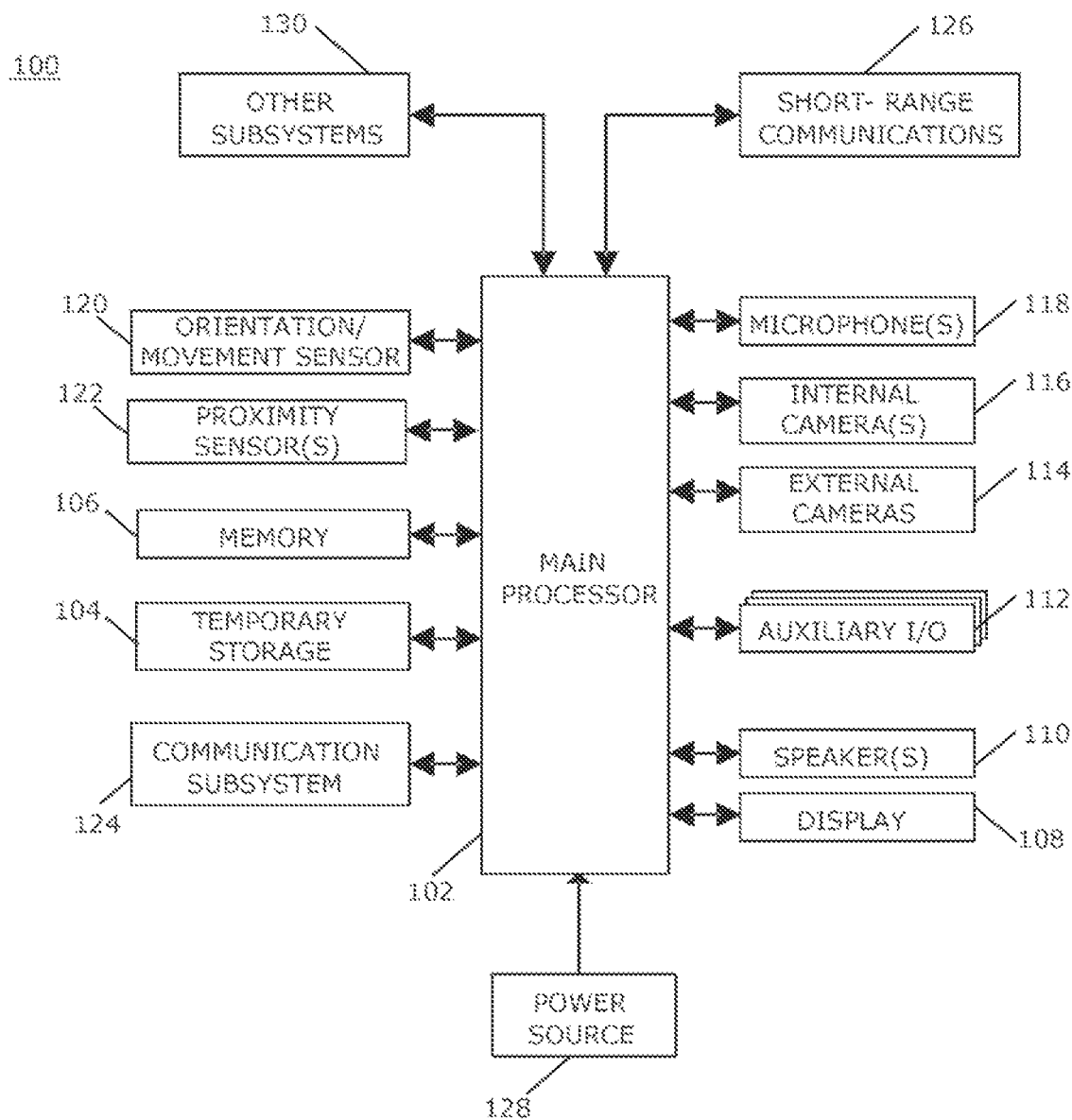
FIG. 1 is a simplified block diagram of a of an immersive display accordance with an example embodiment.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The following describes an immersive display and a method of operating the immersive display to provide information relating to an object. The method includes receiving information from an input device of the immersive display or coupled to the immersive display, detecting an object based on the information received from the input device, and displaying a representation of the object on images displayed on a display of the immersive display such that attributes of the representation distinguish the representation from the images displayed on the display, wherein the representation is displayed at a location on the display that corresponds with a location of the object.

A simplified block diagram of an example of an immersive display 100 is shown in FIG. 1. The immersive display 100 includes multiple components, such as a main processor 102 that controls the overall operation of the immersive display 100.

The main processor 102 interacts with other components of the immersive display 100, including, for example, a temporary storage device 104, a memory 106, a display device 108, a speaker 110, an auxiliary input/output (I/O) subsystem 112, external cameras 114, one or more internal cameras 116, one or more microphones 118, an orientation/movement sensor 120, one or more proximity sensors 122, a communication subsystem 124, short-range communications 126, a power source 128, and, optionally, other subsystems 130.

The temporary storage device 104 may be, for example, Random Access Memory (RAM) that stores data that is processed by the main processor 102. The memory 104, such as flash memory, is utilized for persistent storage.

The immersive display 100 provides video output through the display 108, which includes an interface, a controller and at least one display to display images. The images displayed may be an image in front of at least one of the user's eyes or may include a respective image in front of each one of the user's eyes. In addition to the display 108, output is provided via the speaker or speakers 110 or other audio output such as headphones or earphones. The auxiliary input/output (I/O) subsystem 112 includes an interface through which, for example, a USB controller or other peripheral device may be connected.

Input to the immersive display 100 may be provided via the external cameras 114 mounted on the body of the immersive display 100. The external cameras 114 may include multiple cameras to obtain images extending around the user, i.e., 360° around the user. The external cameras 114 may also include cameras to obtain images in an upward direction from the user, and in a downward direction from the user. Each of the external cameras 114 includes the functional components for operation of the camera, including the lens, the image sensor, and, optionally, a light sensor and light source, such as infrared light emitting diodes (LEDs). Thus, the cameras provide images of the user's environment or surroundings. The external cameras 114 may be one or more of visual light cameras, 3D sensing cameras, light field cameras, forward looking infrared cameras, near infrared cameras, ultraviolet cameras, or other imaging devices. The external cameras 114 may optionally include one or a plurality of lenses that are corrected for a user's vision such that the image that is displayed on the display 108 of the immersive display 100 provides a view that is corrected for the user, thus enabling the user to view visual images utilizing the external cameras 114 without use of eyeglasses or other corrective eyewear.

The terms upward and downward are utilized herein to generally describe direction of view of the external cameras 114 relative to the user when the immersive display is worn by the user and the user is in an upright position, and such terms are not otherwise limiting.

The one or more internal cameras 116, also referred to herein as the internal camera 116, may be mounted on an inside of the body of the immersive display 100 and includes the functional components for operation of each internal camera, including the lens, the image sensor, and a light source, which may be a light source in the non-visible spectrum, such as infrared LEDs. Although the interior of the immersive display 100 may be dark because exterior light is blocked out or partially blocked out, the light source provides sufficient light for use of the internal camera 116. The inside body of the immersive display 100 may be configured with a light source operable to provide sufficient light to illuminate the eyes of the user to enable eye tracking or one or more other eye condition evaluation operations or both eye tracking and eye condition evaluation. The light source may be configured to provide spectral light that does not interfere or presents very little or no noticeable interference with the user's ability to view images displayed on the immersive display.

The one or more microphones, referred to herein as the microphone 118, may also be mounted in the body of the immersive display 100 to provide input by converting audible information to electrical signals, which may be processed by the main processor 102 and may be transmitted to another electronic device to which the immersive display 100 is coupled. For example, the immersive display may be coupled to a smart-phone, a laptop computer, a tablet, a desktop computer, a game device, and any other suitable electronic device. Thus the speakers or other sound generating devices in such other one or plurality of electronic devices may be used in association or coordination with the immersive display 100.

The main processor 102 also receives signals from the orientation/movement sensor 120, which is coupled to the body of the immersive display 100. The orientation/movement sensor may be, for example, an accelerometer, a gyro sensor, or any other suitable sensor or combination of sensors that is or are utilized to detect direction of movement, direction of gravitational forces, and reaction forces so as to determine, for example, the orientation of the immersive display 100 and the movement of the immersive display 100. Such orientation information may be utilized to enable recording of sound by the microphones in coordination with visual images to provide a more realistic immersive experience for the user.

The one or more speakers 110 or other sound generators, referred to herein as the speaker or speakers 110, may also be mounted in the body of the immersive display to provide sonic by converting electronic signals into audible information and such electronic signals may also be transmitted to another electronic device or plurality of other electronic devices to which the immersive display 100 is coupled. For example, the immersive display 100 may be coupled to a smart-phone, a laptop computer, a tablet, a desktop computer, a game device, and any other suitable electronic device. Thus, speakers or other sound generating devices in such other one or plurality of electronic devices may be used in association or coordination with the immersive display.

The main processor 102 also receives signals from the orientation/movement sensor 120, which is coupled to the body of the immersive display 100. The orientation/movement sensor may be, for example, an accelerometer, a gyro sensor, or any other suitable sensor or combination of sensors that is or are utilized to detect direction of movement, direction of gravitational forces, and reaction forces so as to determine, for example, the orientation of the immersive display 100 and the movement of the immersive display 100. Such orientation information may be utilized to enable generation of sound by the speaker or speakers in coordination with visual images to provide a more realistic immersive experience for the user.

The one or more proximity sensors, referred to herein as the proximity sensors 122, may provide additional input to the main processor 102 to detect the presence of objects that are near or proximal to the sensor and thus to the user when the immersive display 100 is in use. The proximity sensors 122 may be any suitable proximity sensors such as a capacitive or photoelectric proximity sensor. The proximity sensors 122 may be connected to the main processor 102 via wireless connection, for example, via the short-range communications system 126.

The communication subsystem 124 receives signals from another electronic device and sends signals to the other electronic device to which the immersive display 100 is coupled. Thus, for example, the signals from the microphone 118 or signals from the external cameras 116 or from the internal camera 116 may be sent via the communication subsystem 124. The communication subsystem 124 is also responsible for receiving signals from the other electronic device for processing by the main processor 102 to cause images, which may include video, to be displayed on the display 108 and for audio to be output through the speaker 110.

The immersive display 100 optionally includes short-range communications 126 to perform various communication functions. For example, the immersive display 100 may include Bluetooth or infrared (IR) communications capability, for example, for communicating with a peripheral device or accessory.

The power source 128 may be one or more rechargeable batteries or a port to an external power supply to power the immersive display 100.

The systems and subsystems that interact with the main processor 102 and are described herein are provided as examples only. Other subsystems 130 may also interact with the main processor 102.

Utilizing the images from the internal camera 116, the main processor 102 may be operable to track eye motion. To track eye motion, the user's pupils may be tracked when the immersive display 100 is in use. The eye motion tracking may also facilitate determination of what a user is looking at, for example, by triangulation to determine depth of an object or image that is user is looking at. Alternatively, the internal camera 116 may identify or track changes in muscles or muscle motion around at least one of the user's eyes to identify movement of the eye, or may track changes in shape of a lens of an eye or changes in shape of the lens of each eye to identify a focal distance, facilitating identification of the depth of focus of a user.

Based on the eye motion tracking, the direction that the user is looking may be identified. The direction may be, for example, an angle or angles, such as angular offset or offsets from straight ahead. Thus, when a user glances upwardly, downwardly, or to either side, the direction is identified and the images displayed utilizing the display 108 may be changed or adjusted based on the direction.

The eye-motion tracking may be utilized in association with one or more vision correction programs utilized by the main processor to effectuate effective vision correction for the user. Such tracking may be utilized to determine where in the visual field the user is looking and how the user's eye or eyes are reacting to visual stimuli in order to provide appropriate image correction for a user's vision with respect to visual information provided to the immersive display 100 from the external cameras 114 or other visual images displayed on the display 108. Depth of field information may be provided to the main processor 102 with respect to objects viewed via the display 108 through the use of the external cameras 114. Such depth of field information may be provided to the main processor 102. Such depth of field information may also be provided to the main processor 102 by one or more devices associated with the immersive display 100 that provide a signal, such as a radio signal, and a reflected signal detection device or devices configured to provide range finding of objects in the field of view of the external cameras 114. Thus, a user of the immersive display 100 configured with (1) sight correcting programming that adjusts displayed information in accordance with a user's vision correction prescription or as otherwise desired or required to correct a user's eyesight, and (2) additional depth of field focus components as indicated above can use the external cameras 114 and the display 108 associated with the immersive visual display so configured as a substitute for corrective eyeglasses or other corrective eyewear.

The main processor 102 may be provided with one or more programs to configure the immersive display to determine the user's vision quality status. Such programs may be utilized, for example, in association with the above-noted eye tracking features to determine the amount of correction of visual images displayed on the display 108 of the immersive display 100 in order to provide clear images to the user without the use of prescriptive eyewear.

The external cameras 114 may include night vision cameras. Night vision images from such night vision cameras, which images tend to be monochromatic, may be appropriately color corrected utilizing color correction software to provide a user with colorized images displayed on the immersive display in low light situations.

The main processor 102 is also operable to receive the image data from the external cameras 114 and to transmit the data to the other electronic device, along with metadata for at least key frames for identifying the image data such that the images can be stitched together to provide images of the user's surroundings. Thus, the images from each of the cameras can be stitched together to obtain images of the user's entire surroundings. Similarly, sound data can be utilized to provide sound from the user's entire surroundings.

A plurality of immersive displays 100 may be utilized in conjunction with one another to record or transmit a panoramic or surround-type of representation of real world visual, audio, or audio and visual information. When a recording or transmission is intended to capture a scope of coverage, for example, 360 degrees, 270 degrees, or other, the main processor 102 may be configured to provide to the users of the immersive displays 100, cues or other warnings or other indicators, such as visual indicators displayed on the display 108 of the immersive display 108, that show the user where to direct the immersive display 100 in order to capture and provide images and other information for that user's immersive display's contributive portion of recorded or transmitted information. Thus, the immersive displays 100 may each be provided with cues, warnings, or indicators to direct each user of immersive displays 100 such that together, the plurality of immersive displays 100 acquire the desired scope of coverage of recording and or transmission. For example, a first user among three users, may be provided with a graphic representation on the display 108 of the user's immersive display to dynamically indicate a zone or region where the immersive display 100 should be directed to capture images and other data utilizing the external cameras 114 and other input devices. Similarly other users may each receive a respective graphic representation on their respective displays 108. The three users together may capture, via the external cameras 114, images or visual data extending 360 degrees around the users. Thus, in this example, each user is provided with a visual cue to facilitate direction of the external cameras 114 of each of the three immersive displays 100 such that together, the three immersive displays 100 obtain sufficient data to obtain images that can be stitched together to provide a 360 degree panoramic representation of the visual information for recording or transmission or both recording and transmission.

Figure 2:
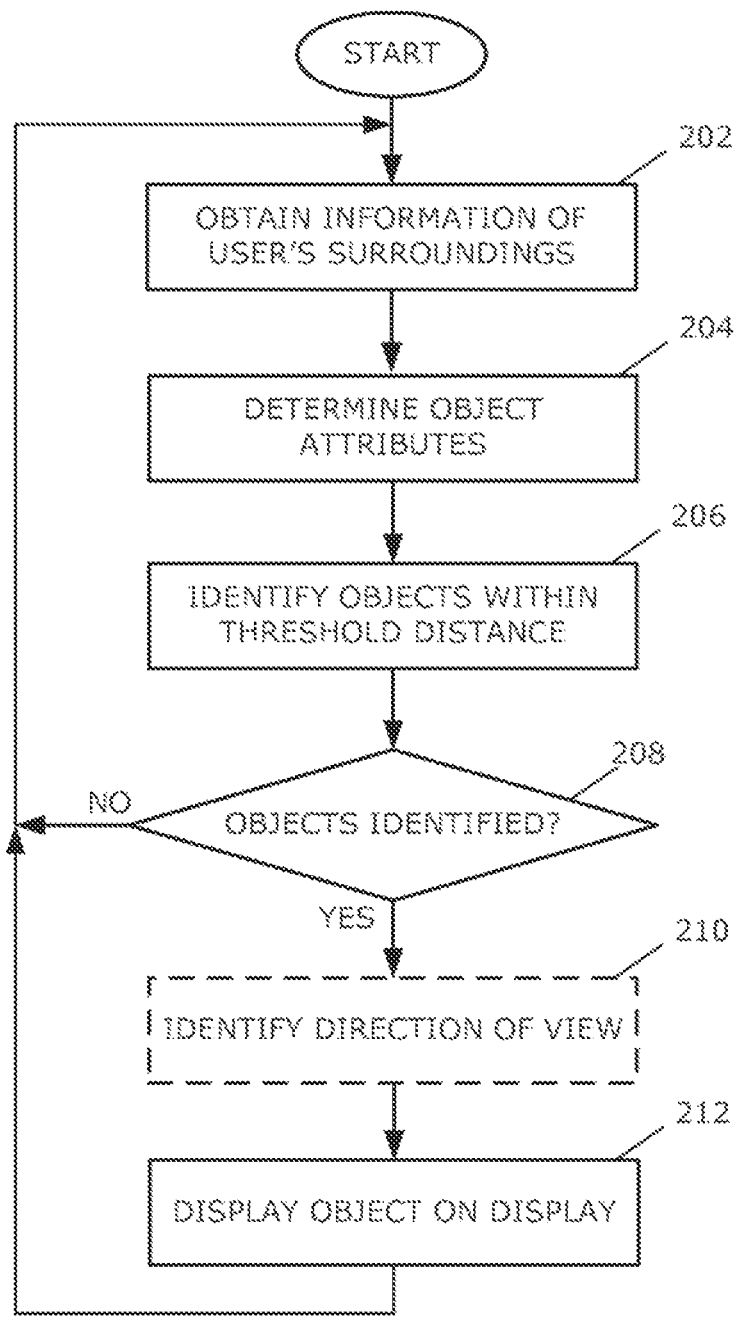
FIG. 2 is a flowchart illustrating an example of a method of controlling the immersive display in accordance with the disclosure.

A flowchart illustrating a method of displaying images on a display of an immersive display is shown in FIG. 2. The method may be carried out by software executed, for example, by the main processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

As indicated above, the immersive display 100 may obstruct or block the user's vision of his or her surroundings in order to immerse the user in the environment projected utilizing the display 108. Thus, objects that are near the user or in the way of the user when the immersive display is utilized may be obstructed by the immersive display. For example, for an immersive display that is worn on the head of the user, hazards or objects that are near or approaching the user may not be visible or apparent to the user.

The main processor 102 receives information from the exterior of the immersive display 100. The information may be information obtained utilizing the external cameras 114 and the proximity sensors 122 at 202. Based on the images obtained utilizing the external cameras 114 and the proximity sensors 122, the immersive display 100, detects objects that are near the user or that are approaching the user.

In addition, to the information obtained using the external cameras 114, and the proximity sensors 122, the information may be information obtained from, for example a peripheral accessory such as a glove, or a sock that is equipped with a proximity sensor or proximity sensors and is in communication with the immersive display 100 via the short-range communications 126. Thus, gloves or socks that may be worn by the user to track movement of the hands or feet of the user may also be utilized to provide proximity information to the main processor 102. The gloves or socks may also be equipped with haptic feedback devices such as piezoelectric actuators, or vibrational devices to provide the user with feedback based on the locations of the user's hands or feet. In one aspect, the illusion of reality may be furthered by creating an artificial environmental element, such as a virtual "seeing eye dog", that would accompany other feedback received from the immersive display 100. For example, to indicate an object ahead and to the right, the virtual dog may appear to "tug" the leash on the user's right hand and the user's glove tightens accordingly. The peripheral accessory or a plurality of peripheral accessories may provide such proximity information to the main processor 102 via wireless transmission.

The peripheral accessory or accessories may be utilized in association with information provided to the main processor 102 regarding the range of motion of the user's limbs or other body parts is obtained and used in association with the object detection described herein. Such range of motion information may be utilized by the processor 102 in association with detection of the location of the user's limb or limbs or other body parts using one or more peripheral accessories in association with one or more collision avoidance programs to provide warnings to the user that movement of such user's limbs or other body parts may collide with one or more objects located within a region associated with such range of motion. Visual information may be displayed, via the display 108, indicating the area or areas that are displayed and that correspond to the area or areas that are within such region or regions. Such areas may be displayed with an identifiable display attribute, such as a red hue, for example Object attributes are determined at 204. The object attributes include the distance of the object from the immersive display 100 or from the peripheral accessory. The object attributes may also include the rate of change of the distance between the object and the immersive display 100 or the velocity of the object and the rate of change of the velocity over time. Thus, the immersive display 100 may identify that an obstruction is near the user based on proximity of the obstruction, and may identify what the obstruction is. For example, the immersive display 100 may identify stationary objects such as a table, a chair, a wall, stairs, a cat, a dog, or any other object that is in close proximity to the user. The immersive display may also identify objects that are approaching the user, such as a car, a bicycle, or other moving object that is moving towards or in a direction that will cause the object to move near the user.

Object attribute information may be obtained from remote databases. For example, object image information may be transmitted by the immersive display 100 to a remote processor that utilizes such information to determine what the object is through the use of object recognition software such as the type developed by Google, Inc. Information regarding object identification, and other information regarding the object may then be provided to the immersive display 100 for display utilizing the display 108.

Objects that are within a threshold distance are identified at 206. The threshold distance may vary based on any suitable factor, including the location of the object, the type of object, and the object attributes. For example, the threshold distance for stationary objects may be lower, or a shorter distance, than the threshold distance for objects that are moving relative to the user, such as an object travelling towards or approaching the user. Furthermore, the threshold distance may be greater for objects that are moving towards or are approaching the user at a greater velocity.

The threshold distance may vary based on direction of the object relative to the orientation of the user. For example, the threshold distance may be greater for a stationary object that is in front of a user than a stationary object that is behind a user.

The threshold distance may also vary based on the object. For example, the threshold distance may be greater for a car approaching a user than for a person approaching a user.

The threshold distance may be calculated based on any suitable factor or may be identified from stored threshold values, for example, from a lookup table. Objects that are within the threshold distance or distances are identified for display at 206. An object may not be identified at 206 when the object is a sufficient distance away. For example, the main processor 102 may only identify a stationary object that is within a few meters of the external cameras 114 or may only identify a car or bicycle when the car or bicycle is within 20 meters of the external cameras 114.

When an object is identified at 206, i.e., an object is within a threshold distance, the method proceeds from 208 to 210. When no objects are identified, the method returns to 202 and information regarding the user's surroundings is obtained again utilizing, for example, the external cameras 114, the proximity sensors 122, and a peripheral accessory or accessories.

Optionally, the line of sight of the user is identified at 210. The line of sight of the user may be identified based on the direction of the user and by tracking eye motion utilizing the internal camera 116 when the immersive display 100 is in use. Thus, the direction that the user is looking may be identified. The direction may be, for example, an angle or angles, such as angular offset or offsets from straight ahead.

A representation of the object is displayed on the display 108 at 212 at a location on the display 108 that corresponds with the location of the object relative to the external cameras 114. Thus, for example, a representation of an object that is directly in front of the user, at a distance of 3 meters, is displayed such that the displayed representation of the object appears to be directly in front of the user, at a distance of 3 meters. The representations that are displayed may optionally depend on the direction that the user is looking within the immersive display 100 to give the user information about the direction of objects or hazards in front of the user or in the direction that the user is looking. By displaying the representations of objects in such a way that the user can easily distinguish between the representation and virtual reality, hazards are identified and are not mistaken for virtual reality, reducing the risk that a user may ignore such displayed elements. Optionally, the displayed content may include a mirror, such as a rearview mirror for displaying representations of objects that are behind the user. Thus, a user can glance upwardly into the rearview mirror to see representations of objects that are behind the user. Side mirrors may also be displayed for displaying representations of objects.

The representation of the object is displayed in such a way to distinguish between virtual reality displayed on the display 210 and the representation of the object. Thus, the attributes of the representation distinguish the object from the virtual reality images displayed on the display 108. For example, the representation may be displayed as a wireframe representation layered or superimposed on the virtual reality images that are displayed. The representation may be displayed in a color or contrast that distinguishes the representation from virtual reality such that the user can easily identify that the representation is not part of the virtual reality that is displayed on the display 108.

Optionally, the display attributes of the representation may be dependent on the distance of the object from the user. For example, as the user moves closer to the object or as the object moves closer to the user, the color may change, the brightness may change, or the displayed representation may transition from a transparent wireframe to an opaque object. In one example, the color changes from a green wireframe to an orange wireframe when the distance to the object decreases from greater than a threshold distance to within the threshold distance.

The display attributes of the representation of the object may also be dependent on the velocity or the change in velocity over time. For example, a car that is 30 meters away and that is moving towards a user at 30 kilometers per hour may be displayed in a different color than a car that is 30 meters away and that is moving towards the user at 5 kilometers per hour.

Optionally, the main processor 102 may stitch together images from the external cameras 114 and may display the user's environment or surroundings, thereby interrupting the display of the virtual reality when the user is very close to, or within another threshold distance of an object such that when the user is in danger of bumping into, falling down, stepping on, or being hit by the object, the virtual reality is interrupted to display the user's surroundings. Thus, multiple thresholds may be utilized for an object, for example to determine when to display a representation of the object, to determine the display attributes of the representation, and to determine when to interrupt display of virtual reality. A first threshold may be utilized to determine when to display a representation of an object by superimposing the image on the virtual reality. Another threshold may be utilized to determine when to interrupt the virtual reality by displaying an image of the object. Other thresholds may also be utilized that are intermediate the first threshold and the threshold that is utilized to determine when to interrupt the virtual reality. The other thresholds may be utilized to change attributes of the displayed representation of the object depending on distance from the object.

In one example, a wireframe representation of a table is shown as a user nears a table. The displayed representation may be very faint when the determined distance is, for example, two meters from the table. When the distance is within a meter of the table, the representation is brighter and is displayed with lines of greater thickness. When the distance is less than 30 centimeters, the virtual reality is interrupted and the user's surroundings are displayed on the display 108. Thus, the representation is distinguished from any part of the virtual reality that is displayed.

In another example, a wireframe representation of a motorcycle and driver is shown in a rearview mirror displayed on the display 108 when a motorcycle is behind the user. The displayed representation may be yellow when the motorcycle is 60 meters away and is moving at a speed of a few meters per minute. When the speed of the motorcycle increases, for example, to 20 kilometers per hour, the wireframe representation changes from yellow to red. When the motorcycle speed increases to 40 kilometers per hour, the virtual reality is interrupted and the motorcycle and driver are displayed in the rearview mirror on the display.

In another aspect, the virtual reality environment may include a virtual heads-up display. Taking Google Glass™ as an example, a virtual version of the Google Glass™ display, namely a small display in the upper right corner of the right eye's field of vision may be displayed. The virtual heads-up display may, in this example, display an image of the real environment, based on the images from the external cameras, within the virtual environment. By providing an easy method for the user to view the real environment without leaving the virtual environment, the user can validate the immersive display warnings. In one aspect, this reduces the risk that a virtual element is displayed, maliciously or unintentionally, that emulates a hazard or obstacle warning. In another aspect, the immersive display may filter out virtual objects, or alter the display of such objects, for virtual objects that are within a threshold distance, to reduce the chance that a user may mistake the virtual objects for representations of real objects that pose a hazard.

The relative mix of the display and/or generation of real world visual, audio, or haptic information provided to the processor 102 utilizing the external cameras 114, microphones 118 and/or haptic devices and visual, audio or haptic information provided to the processor 102 by other means, such as by recorded information, which may be virtual world content, may be adjusted by the user, may be automatically adjusted, or may be adjusted both automatically and based on user adjustments. For example adjustment of the relative amounts of real world and recorded information displayed enables the user to comfortably set the relative amount of surrounding real world information provided in association with other displayed information suitable for the user.

The processor 102 may access and use one or more remote collision warning and collision avoidance systems. For example, the immersive display 100 may be configured to associate or interact with one or more of an automobile collision warning system and collision avoidance system.

The immersive display 100 may be embodied in one or more configurations designed to look like ordinary sunglasses.

The described embodiments are to be considered as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. An immersive display apparatus, comprising:
   an apparatus body;
   at least one input device operably connected to the apparatus body for detecting objects in at least one region outside the apparatus body;
   a display inside the apparatus body for displaying a virtual image thereon; and
   a processor coupled to the input device and to the display and operable to:
   receive information from the at least one input device;

determine attributes of a real-world object, including at least a first distance to the real-world object; and in response to determining that the first distance to the real-world object is within a threshold distance, display a wire frame representation of the real-world object.

2. The apparatus of claim 1, where a color of the wire frame representation of the real-world object varies based on a then-current distance to the real-world object.

3. The apparatus of claim 1, where a size of the wire frame representation of the real-world object varies based on a then-current distance to the real-world object.

4. The apparatus of claim 1, where the wire frame representation is displayed in a color or contrast that distinguishes it from other content being displayed on the immersive display apparatus.

5. The apparatus of claim 2, where the color of the wire frame representation of the real-world object varies based on a then-current speed of the real-world object.

6. The apparatus of claim 1, where a warning message is also displayed.

7. The apparatus of claim 1, where the wire frame representation transitions into a different object as a proximity to a user changes.

8. The apparatus of claim 1, where the apparatus further comprises an operably connected haptic device.

* * * * *